US012417753B2

(12) United States Patent
Jin et al.

(10) Patent No.: US 12,417,753 B2
(45) Date of Patent: Sep. 16, 2025

(54) KIND OF DOUBLE-BARS VIOLIN FAMILY WITHOUT SOUND POST

(71) Applicant: SUZHOU LI YUE MUSICAL INSTRUMENTS CO., LTD., Jiangsu (CN)

(72) Inventors: Haiou Jin, Suzhou (CN); Nianbo Wu, Suzhou (CN); Xinxi He, Suzhou (CN); Xinzhi Zhu, Suzhou (CN); Biying Li, Suzhou (CN); Ping Yang, Suzhou (CN)

(73) Assignee: SUZHOU LI YUE MUSICAL INSTRUMENTS CO., LTD., Suzhou (CN)

( * ) Notice: Subject to any disclaimer, the term of this patent is extended or adjusted under 35 U.S.C. 154(b) by 299 days.

(21) Appl. No.: 18/025,791

(22) PCT Filed: Dec. 15, 2020

(86) PCT No.: PCT/CN2020/136578
§ 371 (c)(1),
(2) Date: Mar. 10, 2023

(87) PCT Pub. No.: WO2022/032951
PCT Pub. Date: Dec. 17, 2022

(65) Prior Publication Data

US 2023/0368752 A1 Nov. 16, 2023

(30) Foreign Application Priority Data

Aug. 13, 2020 (CN) ......................... 202010810231.4

(51) Int. Cl.
*G10D 1/02* (2006.01)
*G10D 3/02* (2006.01)

(52) U.S. Cl.
CPC ................ *G10D 1/02* (2013.01); *G10D 3/02* (2013.01)

(58) Field of Classification Search
CPC ............... G10D 1/02; G10D 3/02; G10D 3/22
See application file for complete search history.

(56) References Cited

U.S. PATENT DOCUMENTS

2011/0162506 A1 7/2011 Yokoyama

FOREIGN PATENT DOCUMENTS

CN 201051375 Y 4/2008
CN 202905128 U 4/2013
(Continued)

OTHER PUBLICATIONS

Feb. 26, 2021 International Search Report issued in International Patent Application No. PCT/CN2020/136578.
(Continued)

*Primary Examiner* — Kimberly R Lockett
(74) *Attorney, Agent, or Firm* — Oliff PLC

(57) ABSTRACT

A double-bar violin family without sound post, including a resonance box, with a front plate, back plate and sidewalls, wherein: two upper bars are parallel on the front plate inner wall; two lower bars are parallel on the back plate inner wall; an upper cross groove sits on the front plate inner wall, and forms an upper cross sound tunnel on the front plate inner wall; a lower cross groove sits on the back plate inner wall, and the lower cross groove forms a lower cross sound tunnel on the back plate inner wall. This breaks the shackles of the traditional bass bar and sound post design in resonance box, eliminates sound post in resonance box, and proposes a new improved design, wherein treble register is not bright, and bass register is not sonorous and mellow enough, so the resonance box produces treble, alto, and bass registers with good timbre.

10 Claims, 13 Drawing Sheets

(56) References Cited

FOREIGN PATENT DOCUMENTS

| | | | | |
|---|---|---|---|---|
| CN | 106710575 A | * | 5/2017 | ............... G10D 1/08 |
| CN | 208351908 U | | 1/2019 | |
| CN | 111445888 A | | 7/2020 | |
| CN | 211181616 U | | 8/2020 | |
| CN | 111951751 A | | 11/2020 | |
| CN | 111951754 A | | 11/2020 | |
| CN | 111951755 A | | 11/2020 | |
| CN | 111951756 A | | 11/2020 | |
| CN | 111951757 A | | 11/2020 | |
| CN | 111951758 A | | 11/2020 | |
| CN | 111951759 A | | 11/2020 | |
| CN | 111951760 A | | 11/2020 | |
| CN | 111951761 A | | 11/2020 | |
| CN | 111951762 A | | 11/2020 | |
| CN | 111986634 A | | 11/2020 | |

OTHER PUBLICATIONS

Zhang. Chengzhong et al. "Research on Vibration Behavior of Violin Sounding Box with Finite Element Numerical Simulation Method and Experiment". Journal of South China Normal University (Natural Science Edition), vol. 46, No. 6, Nov. 30, 2014 (Nov. 30, 2014), pp. 40-46.

* cited by examiner

KIND OF DOUBLE-BARS VIOLIN FAMILY WITHOUT SOUND POST

TECHNICAL FIELD

The present invention relates to bowed stringed instrument, particularly to a kind of double-bars violin family without sound post. The above-mentioned violin family refers to violin, viola, cello, double bass (contrabass), child violin, etc.

BACKGROUND TECHNOLOGY

The violin family is a typical representative of western musical instruments, which is widely spread around the world. It is the most important instrument in the modern orchestra string group, which plays a very important role in the instrumental music. It is the backbone of the modern symphony orchestra. The violin family can be roughly divided into violin, viola, cello and double bass (contrabass). These four instruments belong to the violin family, and have many similarities in shape and structure. But when it comes to the differences, they are too numerous to enumerate, such as the size, playing method, and so on.

The violin family usually consists of a resonance box (sound box), scroll, fingerboard, strings, bridge, chinrest, tailpiece, and pegs. The resonance box (sound box) is an important component that determines the sound quality of the violin family. As shown in FIGS. 1 and 2, a typical resonance box consists of a front plate 1, a back plate 2, sidewalls 3, a bass bar 4, and a sound post 5. The front plate 1, the back plate 2, and the sidewalls 3 make up the body of the resonance box. The bass bar 4 is glued to the inside of the front plate 1 and located under the bass foot of the bridge, and the sound post is a vertical support located between the front plate 1 and back plate 2 under the treble foot of the bridge. The voice range of the violin family usually spans four and a half octaves, with the treble register comprising one quarter of the range, the alto register comprising half, and the bass register comprising one quarter. However, currently, the problem with violin family is that the sound quality in the treble and bass registers is not good enough to show the timbre effect that the violin family should have, due to the limitations of the traditional bass bar and sound post. Specifically, the timbre of treble register is not bright enough, while the bass register is not sonorous and mellow enough. The main reason for this is that the current resonance box cannot achieve good broadband vibration from the treble register to the bass register, that is, it cannot simultaneously adapt to the wide frequency changes and vibrations between the treble, alto, and bass registers. Further research shows that there are many factors affecting broadband vibration in the resonance box, in addition to the top and back plates, the main ones being the bass bar and sound post. The current designs of the bass bar and sound post are not reasonable to help the resonance box achieve good acoustic resonance and vibration between the treble and bass registers. For example, the sound post supports the top and back plates inside the resonance box and is located under the treble foot of the bridge, mainly playing a mechanical role but not a good acoustic role. The bass bar is fixed on the underside of the front plate inside the resonance box and located under the bass foot of the bridge, but not achieving good acoustic effects.

In view of this, the subject of the present invention is how to improve the resonance box of violin family, especially the improvement of the bass bar and sound post inside the resonance box.

SUMMARY OF THE INVENTION

The invention provides a kind of double-bars violin family without sound post, which aims to solve the problem that the existing resonance box of violin family cannot obtain good resonance timbre simultaneously in treble, alto and bass registers.

To achieve the above purpose, the technical scheme adopted by the invention is:

A kind of double-bars violin family without sound post, comprising a resonance box, which is composed of a front plate, a back plate and sidewalls, characterized in that:

The resonance box is equipped with two upper bars, which are long-strip bar components; one side of the both upper bars is tightly fixed on the inner wall of the front plate, while the other side of the two upper bars is suspended in the resonance box relative to the back plate; the length direction of the two upper bars is consistent with the length direction of the resonance box, while in the width direction of the resonance box, the two upper bars are parallel and separated by a distance;

The inner wall of the front plate is provided with a first groove and a second groove; the first groove and the second groove are arranged crosswise and connected with each other on the inner wall of the front plate, wherein the second groove is located between the two upper bars, and the length direction of the second groove is consistent with the length direction of the upper bars; the first groove spans two upper bars in the width direction of the resonance box, and forms an upper transverse sound tunnel on the inner wall of the front plate, while the second groove forms an upper longitudinal sound tunnel on the inner wall of the front plate.

The relevant contents of the above technical proposal are explained as follows:

In the above scheme, the theme is "violin family", and the innovation is concentrated on the "resonance box" of violin family, so in addition to the resonance box, there is no description of scroll, fingerboard, strings, bridge, chinrest, tailpiece, and pegs, etc. It can be considered that, except the resonance box, other structures of the violin family in this invention are realized by the prior art.

2. In the above scheme, the "resonance box" is also known as the sound box or body for the Violin family. The length direction of the resonance box is about the same as the strings, and the width direction of the resonance box is perpendicular to the length direction. For the resonance box, the "inner wall" refers to the inner side wall. For example, the inner wall of the front plate refers to the wall inside the front plate of the resonance box, and the inner wall of the back plate refers to the wall inside the back plate of the resonance box.

3. In the above scheme, the resonance box can also be equipped with two lower bars, which are long-strip bar component; one side of the both lower bars is tightly fixed on the inner wall of the back plate, while the other side of the two lower bars is tightly suspended in the resonance box relative to the front plate; the length direction of the two lower bars is consistent with the length direction of the resonance box, while in the width direction of the resonance box, the two lower bars are parallel and separated by a distance. Meanwhile, the inner wall of the back plate is provided with a third groove and a fourth groove; the third groove and the fourth groove are arranged crosswise and connected with each other on the inner wall of the back plate, wherein the fourth groove is located between the two lower bars, and the length direction of the fourth groove is consistent with the length direction of the lower bar; the third groove spans two lower bars in the width direction of the resonance box, and forms a lower transverse sound tunnel on the inner wall of the back plate, while the fourth groove forms a lower longitudinal sound tunnel on the inner wall of the back plate.

4. In the above scheme, a pillar can be arranged at the intersections of the first groove and the upper bar; one end of the pillar is against the bottom of the first groove and the other end is against the upper bar.
5. In the above scheme, the upper bar can be provided with an upper bridge opening, which is a breach on one side of the upper bar and makes the upper bar form an upper bridge-style bar structure, and the upper bridge opening is erected on the first groove; the lower bar can be provided with a lower bridge opening, which is a breach on one side of the lower bar and makes the lower bar form a lower bridge-style bar structure, and the lower bridge opening is erected on the third groove.
6. In the above scheme, an upper reinforcing plate can be fixed between the two upper bars, and a lower reinforcing plate is fixed between the two lower bars.
7. In the above scheme, the length of the first groove is less than the length of the front plate at the corresponding position of the first groove, and a smooth transition surface is arranged between the two ends of the first groove and the inner wall of the front plate; the length of the second groove is less than the length of the front plate at the corresponding position of the second groove, and a smooth transition surface is arranged between the two ends of the second groove and the inner wall of the front plate. The length of the third groove is less than the length of the back plate at the corresponding position of the third groove, and a smooth transition surface is arranged between the two ends of the third groove and the inner wall of the back plate; the length of the fourth groove is less than the length of the back plate at the corresponding position of the fourth groove, and a smooth transition surface is arranged between the two ends of the fourth groove and the inner wall of the back plate.
8. In the above scheme, the thickness of the front and back plate is a thickness gradient structure that is thick in the central area and thin around.
9. In the above scheme, the first groove, the second groove, the third groove and the fourth groove are all arc grooves.

The design principle and concept of the present invention are: in order to solve the problem that the existing resonance box of violin family cannot obtain good resonance timbre simultaneously in treble, alto and bass registers. The present invention has thoroughly improved the design of the existing resonance box of violin family, especially the bass bar and sound post in the resonance box. It is embodied in the following aspects: First, the original sound post design is canceled; Second, change the original fixed setting of a base bar on the inner wall of the front plate, to fixed and parallel setting of two upper bars on the inner wall of the front plate; Third, the inner wall of the front plate is provided with an upper cross groove (i.e. the first groove and the second groove), which forms an upper transverse sound tunnel and an upper longitudinal sound tunnel on the inner wall of the front plate.

Aiming at the problem that the timbre of treble register is not bright enough while the bass register is not sonorous and mellow enough, the invention carries out in-depth discussion and research on the design of the bass bar and sound post in the resonance box, especially the sound production mechanism, and finally finds out that the main reason for the poor timbre of the treble register and bass register of the existing violin family, is due to the unreasonable design of the bass bar and sound post in the resonance box. Accordingly, the inventor broke the shackles of the traditional bass bar and sound post design of the resonance box of violin family in the past and boldly put forward the improved design scheme of the invention. This improved design scheme changed the former free vibration mode of the resonance box into the current standard vibration mode, and solved the problem that the timbre of treble register is not bright enough while the bass register is not sonorous and mellow enough from the perspective of vibration, resonance and sound production. Practice has proved that the improved design scheme has prominent substantive features and significant technical progress, and has achieved obvious technical results.

With the application of the above technical scheme, the advantages and effects compared with the existing resonance box of violin family are showed as following (to be explained by the best implementation method, i.e. the content of the embodiment of the invention):

1. The invention cancels the sound post, and sets a double-bars structure in the center of the front plate and the back plate (that is, two upper bars are arranged on the inner wall of the front plate in parallel, and two lower bars are arranged on the inner wall of the back plate in parallel). Due to large amplitude and low frequency of bass relative to treble, the bass resonance is concentrated in the central area of the resonance box, and the treble resonance is concentrated in the surrounding edge area of the resonance box, so as to enhance the strength of the central area of the front plate and back plate, playing an important role in improving the timbre and quality of the bass register. Because the front plate and back plate of the violin family are both thick in the central area and thin in the surrounding areas, the thickness gradient structure strengthens the strength of the central area of the front plate and back plate, and relatively changes the thickness gap between the central area of the resonance box and the surrounding edge area, which plays a good role in improving the timbre and sound quality of the treble register.
2. The invention is provided with an upper cross groove (i.e. the first groove and the second groove) on the inner wall of the front plate, which actually forms an upper cross sound tunnel on the inner wall of the front plate. At the same time, the inner wall of the back plate is provided with a lower cross groove (i.e. the third groove and the fourth groove), which actually forms a lower cross sound tunnel on the inner wall of the back plate.

Due to the large amplitude and low frequency of bass relative to treble, bass resonance is concentrated in the central area of the resonance box, and treble resonance is concentrated in the surrounding edge area of the resonance box. The string vibration is collected from the central area of the cross sound tunnel, and rapidly transmitted to the surrounding areas of the resonance box through the upper cross sound tunnel and the lower cross sound tunnel (i.e. tunnels of sound), which plays a key role in improving the timbre and sound quality of the treble register, At the same time, it also plays a good role in improving the timbre and quality of the bass register.

3. The combination design of the double-bars and the cross sound tunnel of the invention divides the space corresponding to the front plate of the resonance box into four resonance areas in overhead view, and at the same time, the space corresponding to the back plate of the resonance box is also divided into four resonance areas, a total of eight resonance areas. When playing the violin family, the string vibration is first transmitted to the central area of the intersection of the sound tunnel, and then transmitted to the eight resonance areas through the sound tunnel, and generates resonance and vibration, so as to amplify the string sound into the resonance of the resonance box. Before the improvement, the violin family can only produce four sound waves, that is, the space corresponding to the front plate forms a resonance area, and the space corresponding to the back plate forms a resonance area, a total of two resonance areas. Each resonance area generates one sound wave volume, plus one chord wave volume, plus one firing wave volume, a total of four sound waves. The improved violin family can produce ten sound waves when playing, of which eight resonance areas produce eight sound waves, plus one chord wave, plus one firing wave, a total of ten sound waves. The quantity of sound waves is the number of sound waves. For the plucked stringed instrument in the specific resonance box, in addition to one chord wave and one firing wave, it mainly depends on the quantity of resonance areas in the resonance box. Generally, when the musical instrument is playing, each resonance area produces one quantity of sound waves. In other words, the number of resonance areas determines the same number of sound waves. In addition, the amount of sound waves directly affects the timbre, penetration and volume of the instrument. Therefore, the design of the invention can significantly improve the timbre of the treble and bass register, and increase the penetration of the treble and bass register.
4. The invention designs the bar as a bridge-type bar structure; in particular, there is a breach on one side of the bar, so that the bar is like a bridge arch structure. When such a bar is erected on the sound tunnel, it is more conducive to the transmission of vibration through the sound tunnel and the resonance of the resonance box.
5. The invention provides a pillar between the first groove and the upper bar. On the one hand, it can strengthen the support strength between the front plate and the upper bar, and on the other hand, it does not prevent the transmission of sound waves from the central area to the surrounding areas through the first groove.
6. The first groove, the second groove, the third groove and the fourth groove of the invention all adopt arc groove, which can minimize the thickness mutation of the front plate and the back plate, as much as possible to avoid affecting the resonance and vibration of the resonance box.
7. In this invention, the upper reinforcing plate is fixed between two upper bars and the lower reinforcing plate is fixed between two lower bars. The first function is to increase the strength of the middle area of the front plate and the back plate, especially between the upper bar and the lower bar. The second is increasing the load when two upper bars and two lower bars resonate, improving the timbre of the bass register, and better solving the problem that the bass register is not sonorous and mellow enough. On the other hand, it strengthens the central area of the resonance box, and relatively increases the strength gap with the edge area around the resonance box, which is also conducive to improving the timbre and sound quality of the treble register.

The above advantages and effects are explained in the best way. However, it needs to be specially emphasized that for the invention, the measures of setting double-bars structure and grooves on the inner wall of the front plate are more important than the equivalent measures on the inner wall of the back plate, and the function and effect are relatively better. The reason is that there is a bridge and strings on the front plate, while the back plate is not directly connected with the bridge and strings. Therefore, setting a double-bars structure and a groove on the inner wall of the front plate is the key to solve the technical problems of the invention, while setting a double-bars structure and a groove on the inner wall of the back plate is the icing on the cake for the invention, which is easily understood by those skilled in the art.

IMAGE DESCRIPTION

In the above figure: 1. front plate; 2. back plate; 3. sidewalls; 4. bass bar; 5. sound post; 6. upper bar; 7. lower bar; 8. first groove; 9. second groove; 10. third groove; 11. fourth groove; 12. upper bridge opening; 13. lower bridge opening; 16. pillar; 17. upper reinforcing plate; 18. lower reinforcing plate.

SPECIFIC IMPLEMENTATION

The present invention is further described below in combination with the figures and embodiments:

Embodiment: A Kind of Double-Bars Violin Family without Sound Post

The violin family usually consists of a resonance box, scroll, fingerboard, strings, bridge, chinrest, tailpiece, pegs and etc. Since the innovation of the invention is concentrated on the resonance box, this embodiment will focus on the structure of resonance box. Therefore, the structure of the scroll, fingerboard, strings, bridge, chinrest, tailpiece, pegs and so on can be considered to be realized by the prior art, which will not be described in detail in this embodiment.

Figure 1:
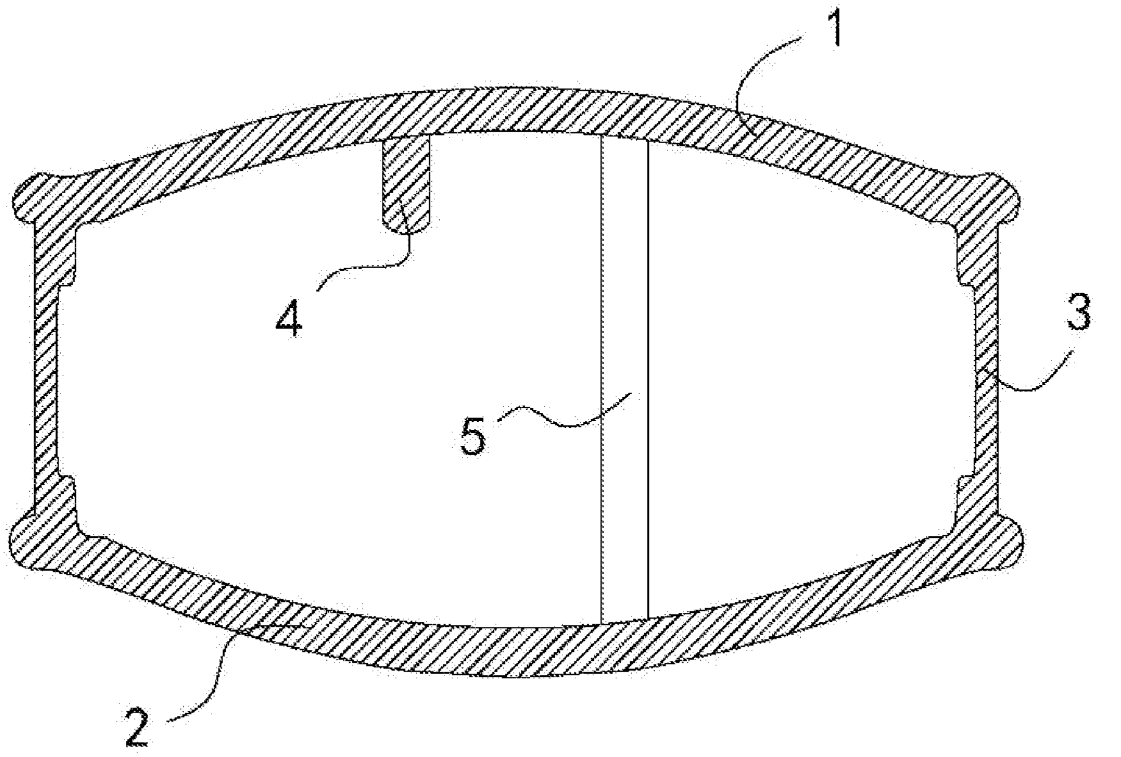
FIG. 1 is a sectional view of an existing resonance box of violin family.
Figure 2:
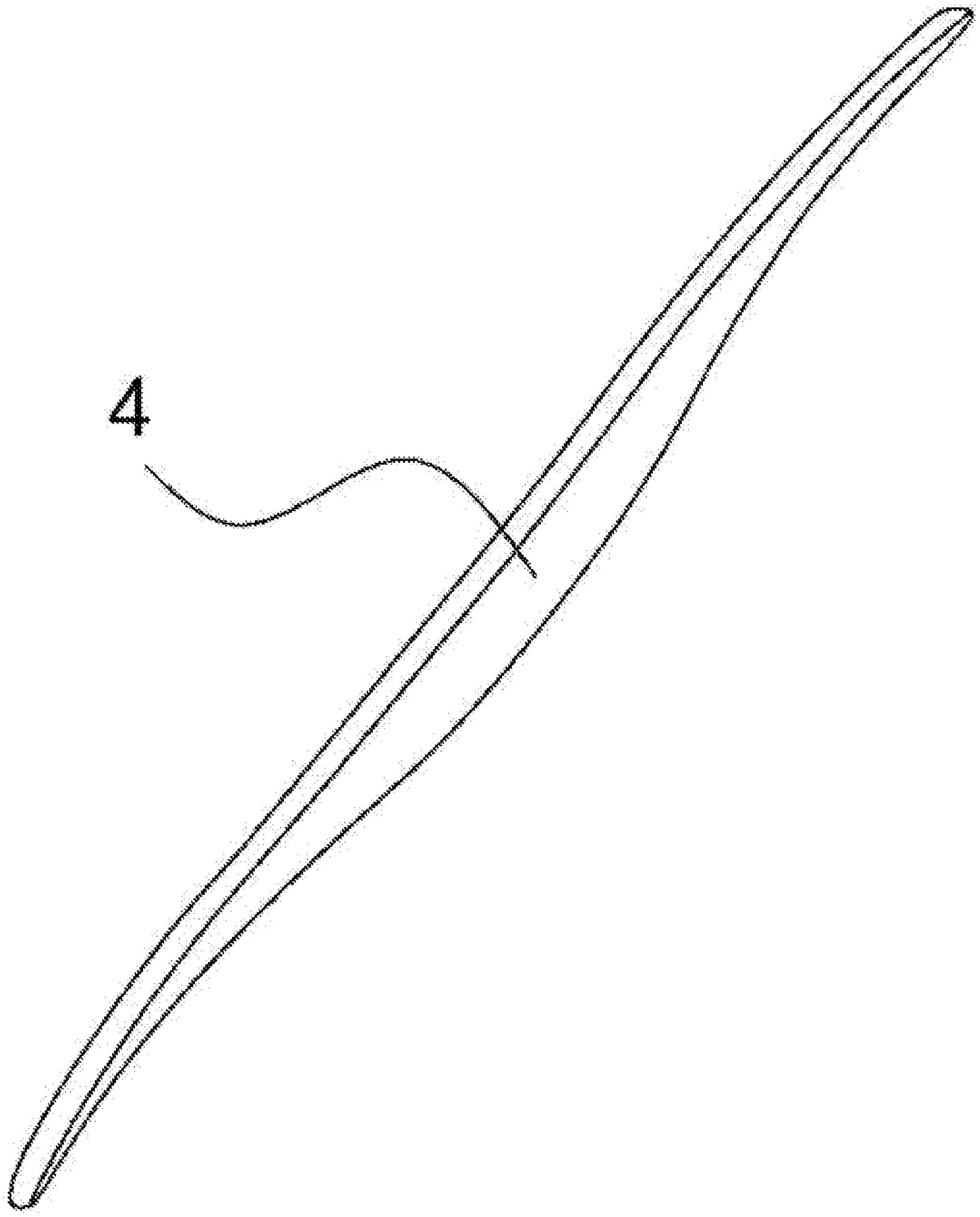
FIG. 2 is a three-dimensional view of an existing bass bar.
Figure 3:
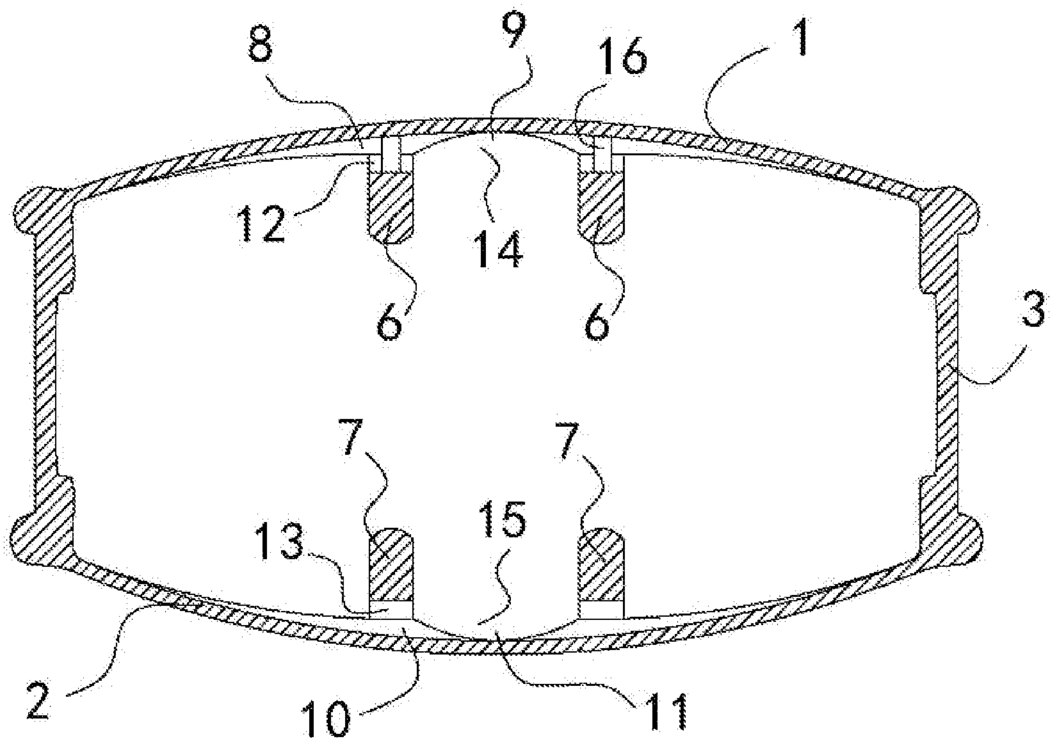
FIG. 3 is a sectional view of the resonance box of violin family in an embodiment of the present invention.
Figure 4:
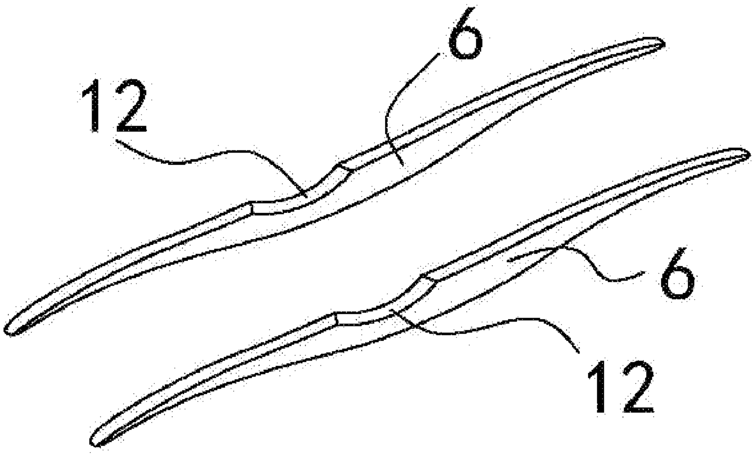
FIG. 4 is a three-dimensional view of two upper bridge-style bars in the resonance box of violin family in an embodiment of the present invention.
Figure 5:
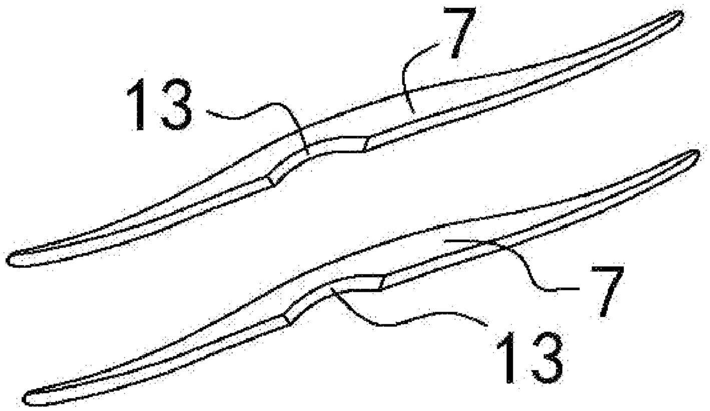
FIG. 5 is a three-dimensional view of two lower bridge-style bars in the resonance box of violin family in an embodiment of the present invention.
Figure 10:
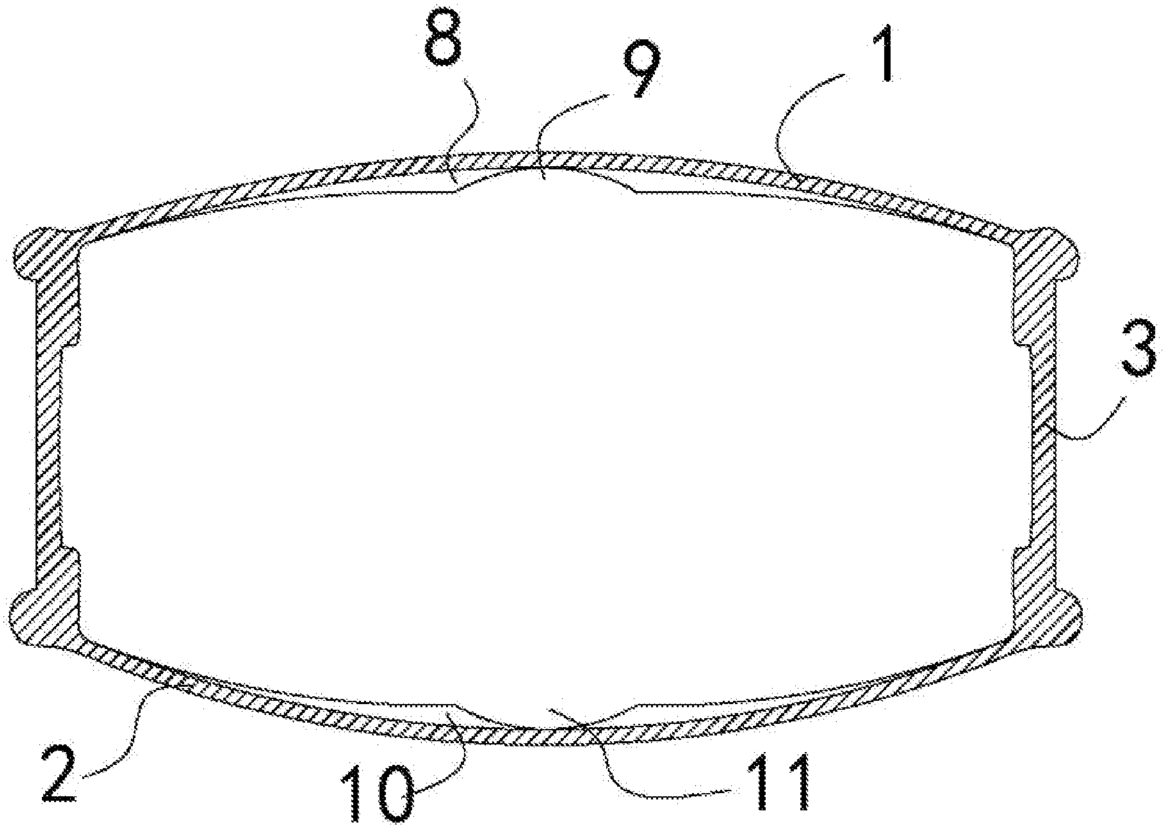
FIG. 10 is a sectional view of the shell of the resonance box of violin family in an embodiment of the present invention.

This embodiment takes the violin resonance box as an example to further describe the structure of the resonance box: as shown in FIG. 3-12, the shell of the violin resonance box is composed of a front plate (1), a back plate (2) and sidewalls (3) (see FIG. 3 and FIG. 10).

Figure 6:
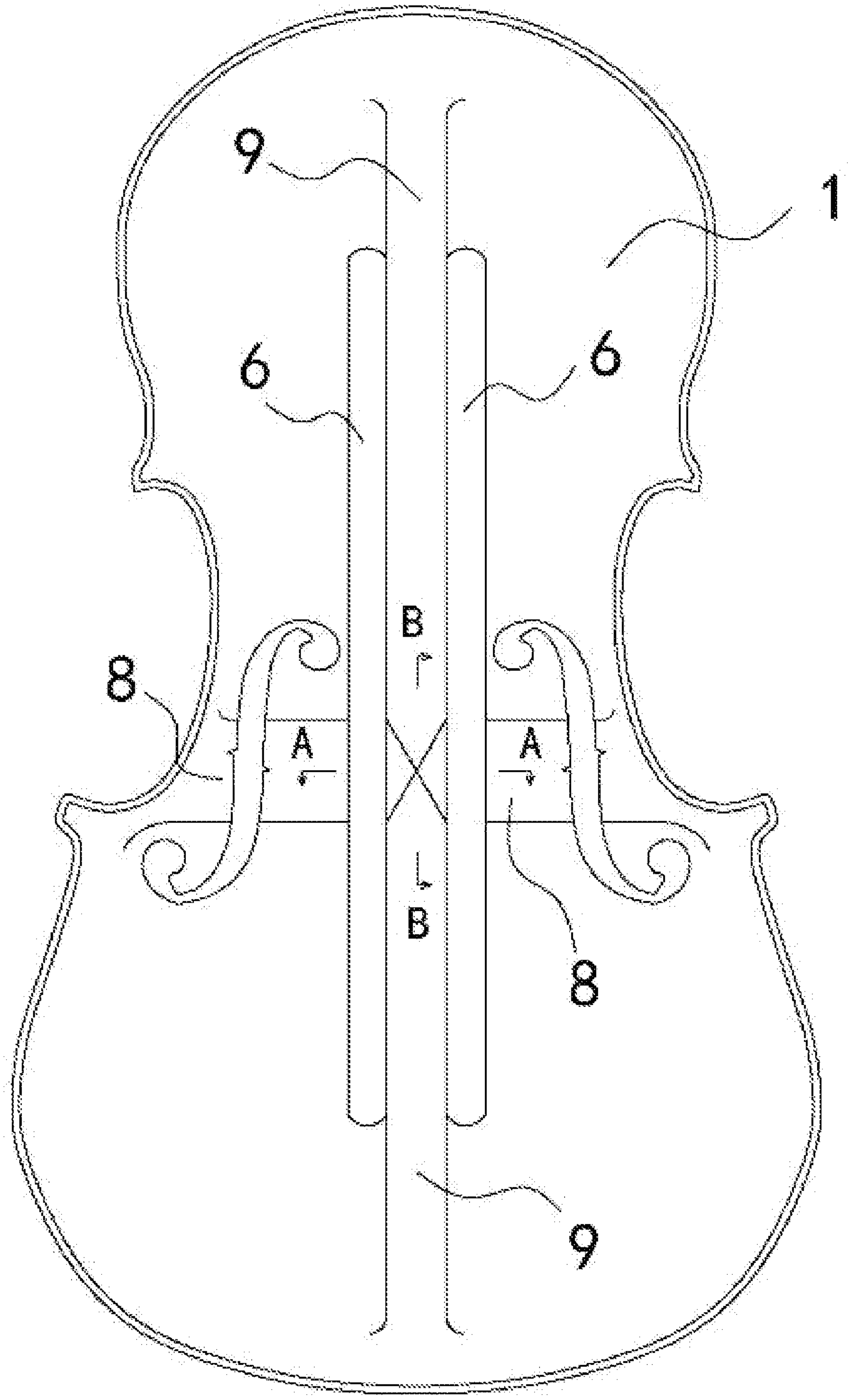
FIG. 6 is a main view of the inner wall of the front plate and upper bridge-style bars in the resonance box of violin family in an embodiment of the present invention.
Figure 7:
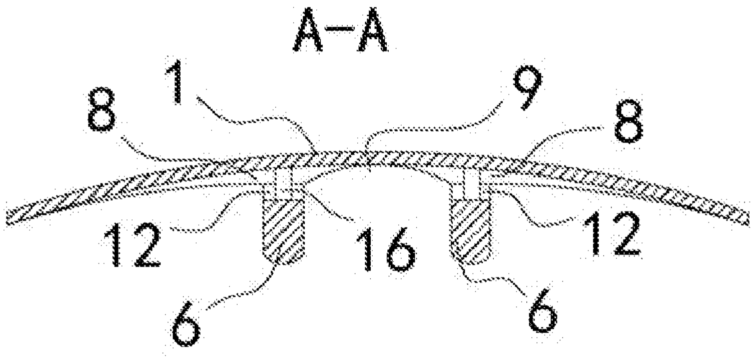
FIG. 7 is the A-A sectional view of FIG. 6.
Figure 8:
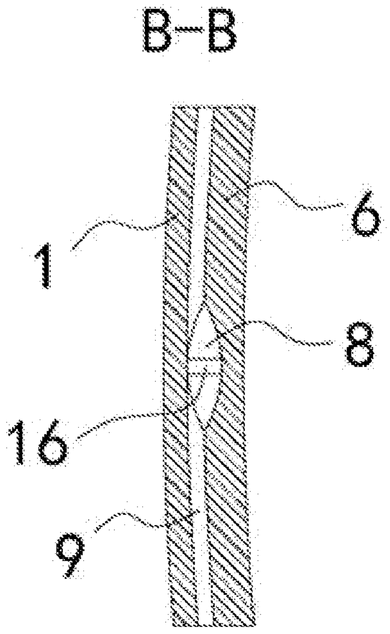
FIG. 8 is the B-B sectional view of FIG. 6.
Figure 9:
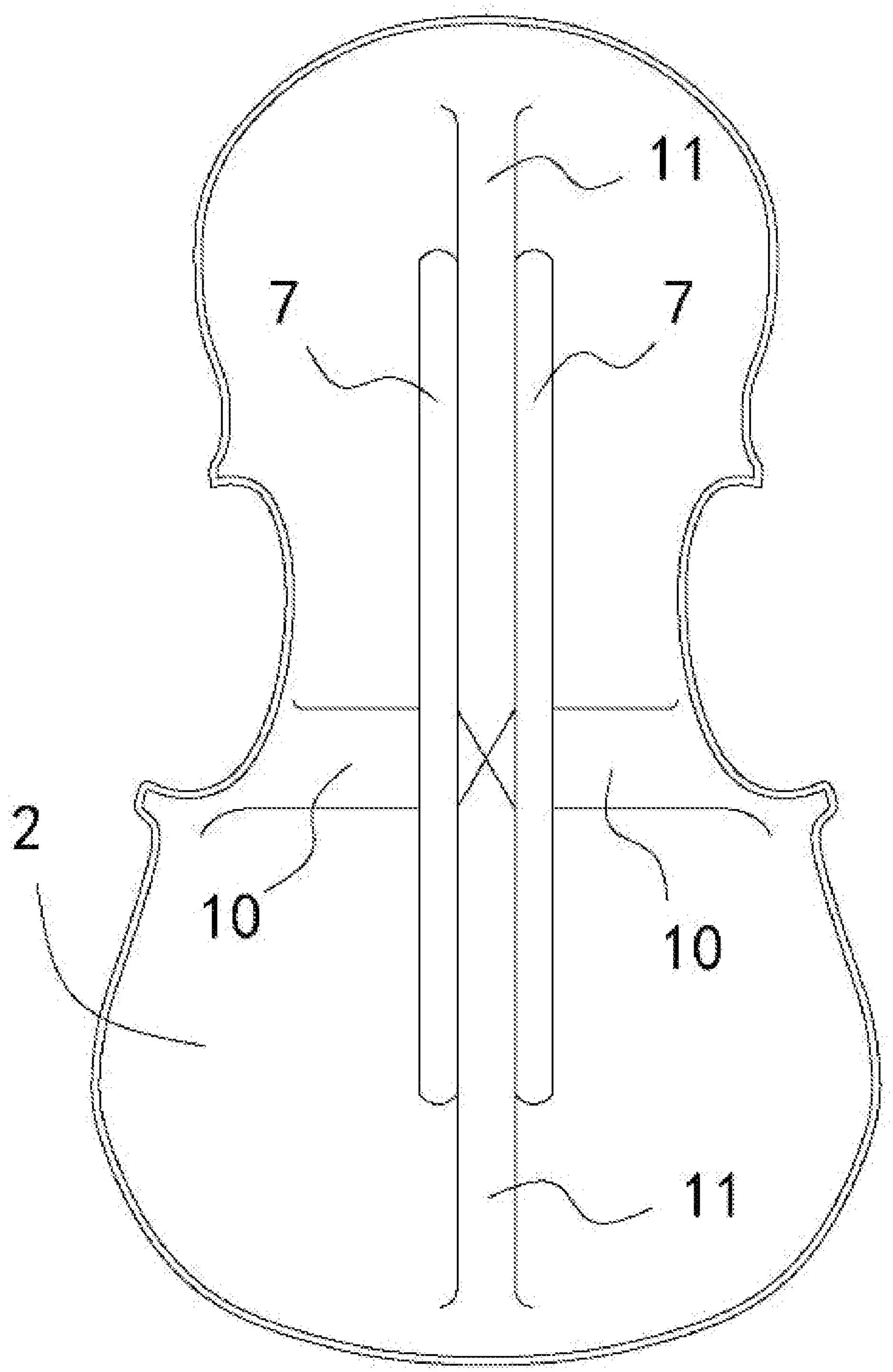
FIG. 9 is a main view of the inner wall of back plate and the lower bridge-style bars in the resonance box of violin family in an embodiment of the present invention.

The resonance box is equipped with two upper bars 6 and two lower bars 7 (see FIG. 3). Both upper bars 6 and lower bars 7 are long-strip bar components (see FIG. 4 and FIG. 5). The upper bar 6 is provided with an upper bridge opening 12, which is a breach on one side of the upper bar 6 and makes the upper bar 6 form an upper bridge-style bar structure, and the upper bridge opening 12 is erected on the first groove 8; the lower bar 7 is provided with a lower bridge opening 13, which is a breach on one side of the lower bar 7 and makes the lower bar 7 form a lower bridge-style bar structure, and the lower bridge opening 13 is erected on the third groove 10. One side of the both upper bars 6 is tightly fixed on the inner wall of the front plate 1, while the other side of the two upper bars 6 is suspended in the resonance box relative to the back plate 2; the length direction of the two upper bars 6 is consistent with the length direction of the resonance box, while in the width direction of the resonance box, the two upper bars 6 are parallel and separated by a distance (see FIG. 3 and FIG. 6). One side of the both lower bars 7 is tightly fixed on the inner wall of the back plate 2, while the other side of the two lower bars 7 is tightly suspended in the resonance box relative to the front plate 1; the length direction of the two lower bars 7 is consistent with the length direction of the resonance box, while in the width direction of the resonance box, the two lower bars 7 are parallel and separated by a distance (see FIG. 3 and FIG. 9);

The inner wall of the front plate 1 is provided with a first groove 8 and a second groove 9 (see FIG. 7, FIG. 8 and FIG. 11); the first groove 8 and the second groove 9 are arranged crosswise and connected with each other on the inner wall of the front plate 1 (see FIG. 11), wherein the second groove 9 is located between the two upper bars 6, and the length direction of the second groove 9 is consistent with the length direction of the upper bars 6; the first groove 8 spans two upper bars 6 in the width direction of the resonance box, and forms an upper transverse sound tunnel on the inner wall of the front plate (see FIG. 6 and FIG. 7), while the second groove 9 forms an upper longitudinal sound tunnel on the inner wall of the front plate (see FIG. 6 and FIG. 8).

A pillar 16 is arranged at the intersections of the first groove 8 and the upper bar 6; one end of the pillar 16 is against the bottom of the first groove 8 and the other end is against the upper bar 6 (see FIG. 7).

Figure 11:
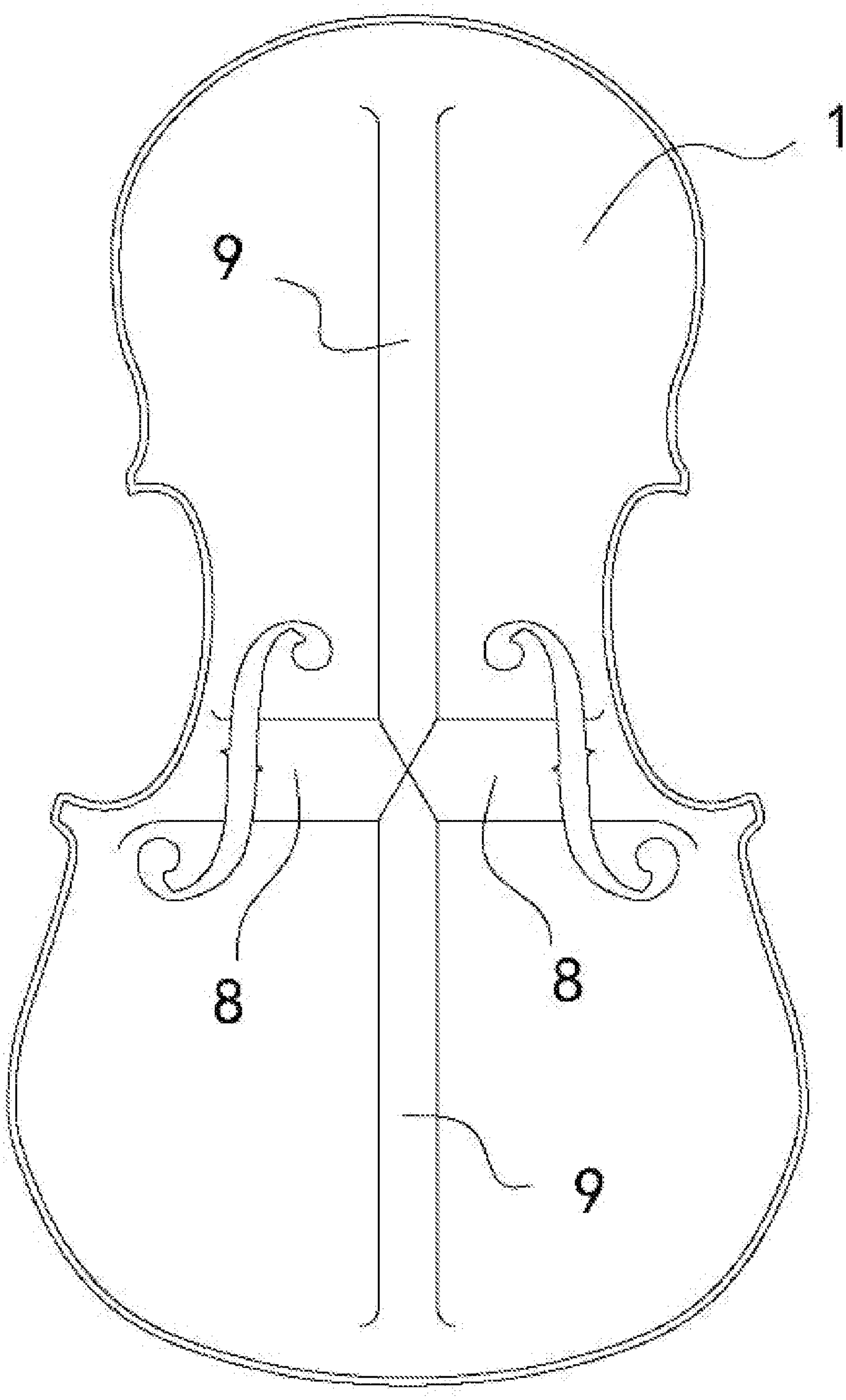
FIG. 11 is a main view of the inner wall of the front plate in the resonance box of violin family in an embodiment of the present invention.

The length of the first groove 8 is less than the length of the front plate 1 at the corresponding position of the first groove 8, and a smooth transition surface is arranged between the both two ends of the first groove 8 and the inner wall of the front plate 1 (see FIG. 11); the length of the second groove 9 is less than the length of the front plate 1 at the corresponding position of the second groove 9, and a smooth transition surface is arranged between the two ends of the second groove 9 and the inner wall of the front plate (see FIG. 11).

The inner wall of the back plate 2 is provided with a third groove 10 and a fourth groove 11 (see FIG. 3 and FIG. 12); the third groove 10 and the fourth groove 11 are arranged crosswise and connected with each other on the inner wall of the back plate 2 (see FIG. 12), wherein the fourth groove 11 is located between the two lower bars 7, and the length direction of the fourth groove 11 is consistent with the length direction of the lower bar 7 (see FIG. 9); the third groove 10 spans two lower bars 7 in the width direction of the resonance box, and forms a lower transverse sound tunnel on the inner wall of the back plate 2 (see FIG. 3), while the fourth groove 11 forms a lower longitudinal sound tunnel on the inner wall of the back plate 2.

Figure 12:
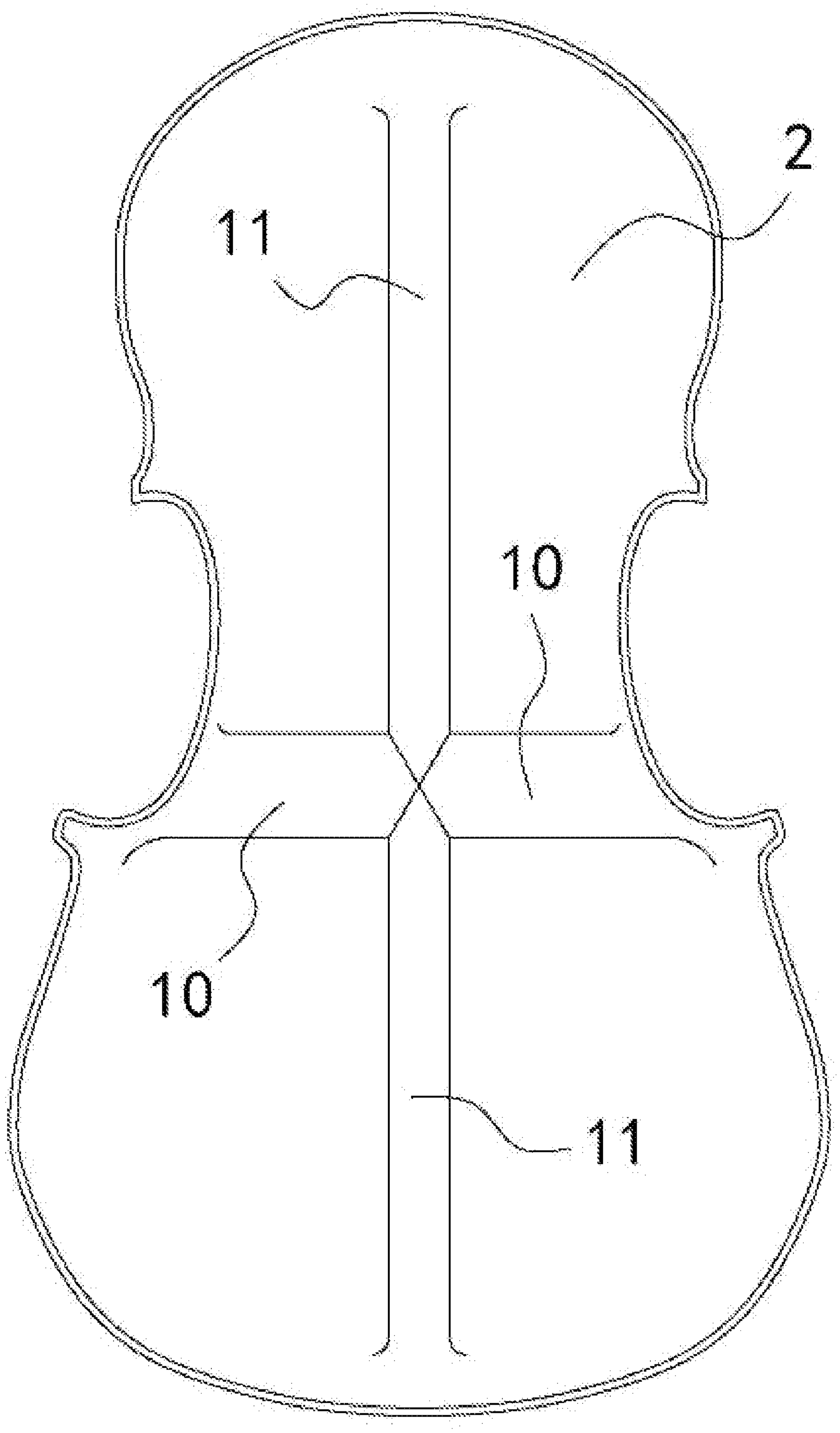
FIG. 12 is a main view of the inner wall of the back plate in the resonance box of violin family in an embodiment of the present invention.

The length of the third groove 10 is less than the length of the back plate 2 at the corresponding position of the third groove 10, and a smooth transition surface is arranged between the two ends of the third groove 10 and the inner wall of the back plate (see FIG. 12); the length of the fourth groove 11 is less than the length of the back plate 2 at the corresponding position of the fourth groove 11, and a smooth transition surface is arranged between the two ends of the fourth groove 11 and the inner wall of the back plate (see FIG. 12).

The thickness of the front plate 1 and back plate 2 is a thickness gradient structure that is thick in the central area and thin around (see FIG. 3 and FIG. 7). The first groove 8, the second groove 9, the third groove 10 and the fourth groove 11 are all arc grooves (see FIG. 3 FIG. 7 and FIG. 8). Among the two upper bars 6, one is located at the corresponding position of the bass foot of the bridge of the violin, and the other is located at the corresponding position of the treble foot of the bridge of the violin (Not shown in Figures). From the cross section of the resonance box, the two lower bars 7 and the two upper bars 6 are arranged correspondingly in the upper and lower directions. The shape and size of the two upper bars 6 are the same (see FIG. 4). The shape and size of the two lower bars 7 are the same (see FIG. 5).

The following describes other embodiments and structural changes of the invention:

1. In the above embodiment, although it is an embodiment corresponding to the violin resonance box, but this invention is not limited to this. Its objects can also be viola, cello, double bass (contrabass), child violin and so on. This is easily understood and accepted by those skilled in the art.
2. In the above embodiments, the inner walls of front plate 1 and back plate 2 are provided with double-bars structures and cross grooves. However, the invention is not limited to this. The measures such as double-bars and cross grooves used on the inner wall of back plate 2 can be canceled or changed to other structural forms. It is also feasible to retain only the technical measures set on the inner wall of front plate 1, but the effect is slightly worse. For the resonance box, front plate 1 is more important than back plate 2. The reason is that the front plate 1 is equipped with bridge and strings, while the back plate 2 is not directly connected with the bridge and strings. This is easily understood by those skilled in the art.

Figure 13:
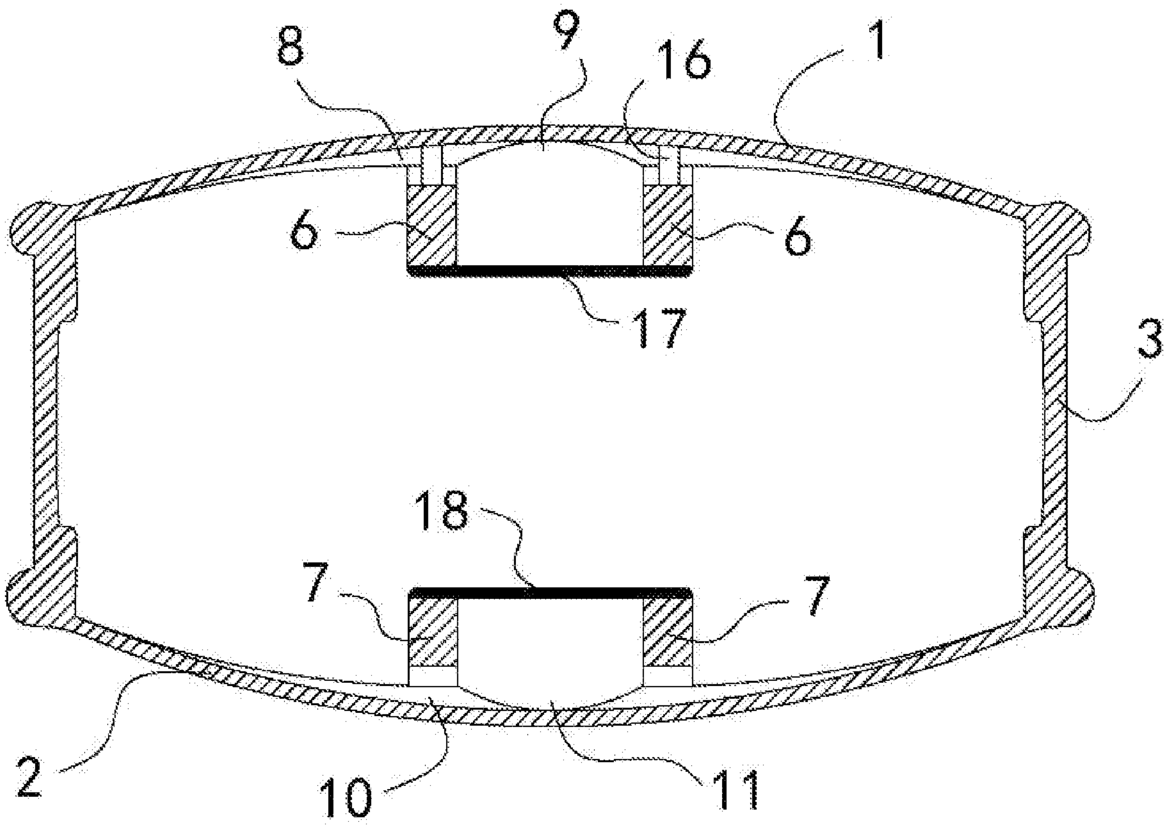
FIG. 13 is a sectional view of the resonance box in which the upper reinforcing plate is added between the upper bars and the lower reinforcing plate is added between the lower bars.
Figure 14:
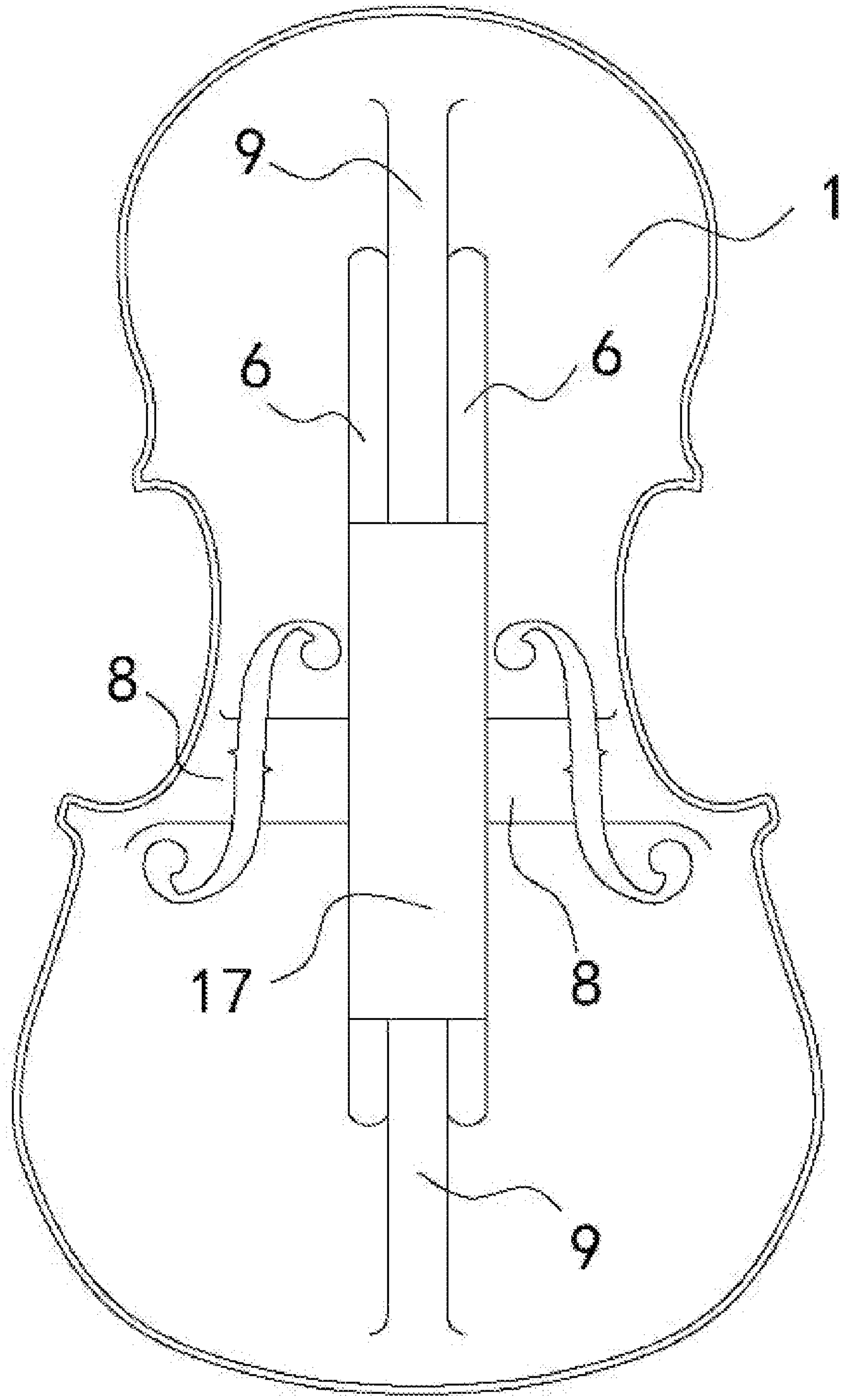
FIG. 14 is a main view of the inner wall of the front plate of the resonance box where the upper reinforcing plate is added between the upper bars.
Figure 15:
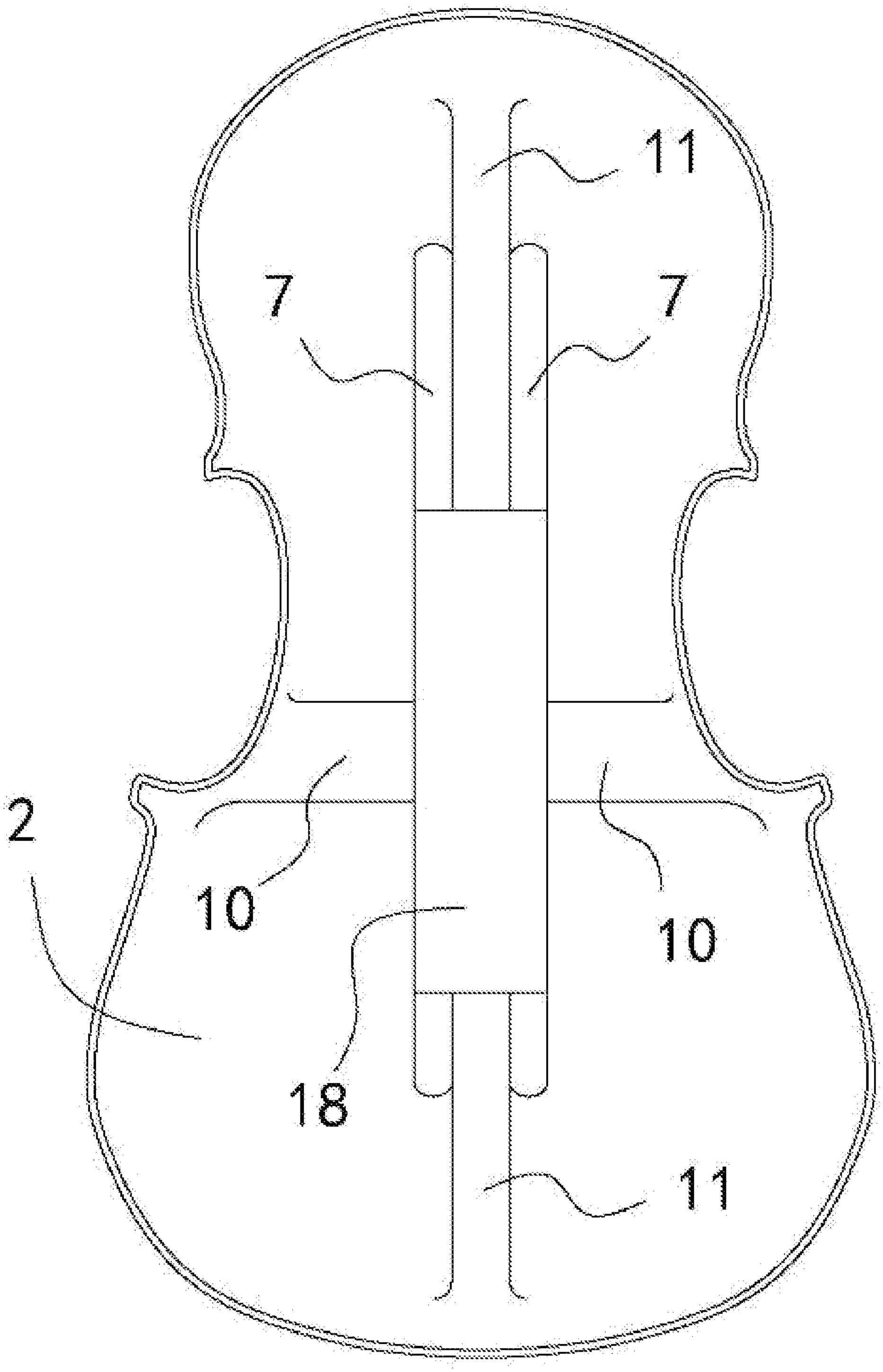
FIG. 15 is a main view of the inner wall of the back plate of the resonance box with the lower reinforcing plate added between the lower bars.

3. In the above embodiment, the inner wall of the front plate 1 and the back plate 2 are provided with a double-bars structure. That is, there are two upper bars 6 on the front plate 1 and two lower bars 7 on the back plate 2. However, this invention is not limited to this: Two upper bars 6 can be formally changed into four upper bars 6 for parallel use. For the invention, four upper bars 6 and two upper bars 6 are different in quantity and form, but they are essentially the same. Suppose that the two outer ones of the four upper bars 6 are close to the two inner ones, which will be equivalent to the double bars. Therefore, it can be considered that this change has not brought unexpected effects and should be understood as substantive equivalence. Similarly, the double-bars structure on the back plate 2 also includes such changes. In the invention, the double-bar contains the meaning of symmetrical arrangement of even number of bars. Therefore, the symmetrical arrangement of the six-bars is also an equivalent variation of the invention. This is easily understood by those skilled in the art.
4. In the above embodiment, two upper bars 6 are parallel in the width direction of the resonance box (see FIG. 6). Two lower bars 7 are parallel (see FIG. 9). However, this invention is not limited to this. The two upper bars 6 and the two lower bars 7 do not necessarily need to be parallel, even if parallel setting is the best, which is easily understood and accepted by those skilled in the art.
5. In the above embodiment, a pillar 16 is arranged at the intersections of the first groove 8 and the upper bars 6. One end of the pillar 16 is against the bottom of the first groove 8, and the other end is against the upper bar 6. However, the present invention is not limited to this: the pillar 16 does not necessarily need to be set; a pillar 16 could also be set both between the first groove 8 and the upper bars 6 and between the third groove 10 and the lower bars 7 at the same time. This is easily understood and accepted by those skilled in the art.
6. In the above embodiment, an upper bridge opening 12 is set on the upper bar 6, and a lower bridge opening 13 is set on the lower bar 7. However, the invention is not limited to this: It could be set without the upper bridge opening 12, the lower bridge opening 13, or even only one bridge opening. This is easily understood and accepted by those skilled in the art.
7. In the above embodiment, two upper bars 6 are fixed on the inner wall of front plate 1 in parallel, and two upper bars 6 are suspended in the resonance box (see FIG. 3). However, the invention is not limited to this: The upper reinforcing plate 17 could be fixed and erected between two upper bars 6 (see FIG. 13 and FIG. 14). Similarly, in the above embodiment, two lower bars 7 are fixed on the inner wall of the back plate 2 in parallel, and two lower bars 7 are suspended in the resonance box (see FIG. 3). However, the invention is not limited to this: The lower reinforcing plate 18 could be fixed and erected between two lower bars 7 (see FIG. 13 and FIG. 15). The upper reinforcing plate 17 and the lower reinforcing plate 18 can increase the strength of the middle area of the front and back plate, especially between the upper and lower bars, and increase the load when two upper bars and two lower bars resonate.
8. In the above embodiment, the first groove 8, the second groove 9, the third groove 10 and the fourth groove 11 are arc grooves. However, the invention is not limited to this: The groove can be designed into other shapes, such as V-shaped, U-shaped, W-shaped and other concave structures. This is easily understood and accepted by those skilled in the art.
9. In the above embodiment, one upper bar 6 is located at the corresponding position of the bass foot of the bridge of violin family, and the other upper bar 6 is located at the corresponding position of the treble foot of the bridge of violin family. However, the invention is not limited to this: They can actually deviate from these positions, which can be determined according to the sound quality and timbre of the resonance box. This is easily understood and accepted by those skilled in the art.
10. In the above embodiment, from the cross section of the resonance box, two lower bars 7 and two upper bars 6 are arranged correspondingly in the upper and lower directions (see FIG. 3). However, the invention is not limited to this: They can be arranged in a misaligned way, which can be determined according to the situation when adjusting the timbre and sound quality of the resonance box. This is easily understood and accepted by those skilled in the art.
11. In the above embodiment, the shape and size of the two upper bars 6 are the same (see FIG. 4). The shape and size of the two lower bars 7 are the same (see FIG. 5). However, the invention is not limited to this: The shape and size of two upper bars 6 can be different, and the shape and size of two lower bars 7 can also be different. The details can be determined according to the situation when adjusting the timbre and sound quality of the resonance box. This is easily understood and accepted by those skilled in the art.

The above embodiments are only intended to illustrate the technical concept and features of the invention, aiming at enable those familiar with the technology to understand the contents of the invention and implement it according to it, which do not limit the scope of protection of the invention. Any equivalent changes or modifications made according to the spirit of the invention shall be covered by the scope of protection of the invention.

The invention claimed is:

1. A double-bars violin family without sound post, comprising a resonance box, which is composed of a front plate, a back plate and sidewalls, wherein:

the resonance box is equipped with two upper bars, which are a long-strip bar components;

a first side of the two upper bars is tightly fixed on an inner wall of the front plate, while a second side of the two upper bars is suspended in the resonance box relative to the back plate;

a length direction of the two upper bars is consistent with a length direction of the resonance box, while in a width direction of the resonance box, the two upper bars are parallel and separated by a distance;

the inner wall of the front plate is provided with a first groove and a second groove;

the first groove and the second groove are arranged crosswise and connected with each other on the inner wall of the front plate;

the second groove is located between the two upper bars, and a length direction of the second groove is consistent with the length direction of the two upper bars; and the first groove spans the two upper bars in the width direction of the resonance box, and forms an upper transverse sound tunnel on the inner wall of the front plate, while the second groove forms an upper longitudinal sound tunnel on the inner wall of the front plate.

2. The violin family according to claim 1, wherein:

the resonance box is equipped with two lower bars, which are a long-strip bar component;

a first side of the two lower bars is tightly fixed on an inner wall of the back plate, while a second side of the two lower bars is tightly suspended in the resonance box relative to the front plate;

a length direction of the two lower bars is consistent with the length direction of the resonance box, while in the width direction of the resonance box, the two lower bars are parallel and separated by a distance;

the inner wall of the back plate is provided with a third groove and a fourth groove;

the third groove and the fourth groove are arranged crosswise and connected with each other on the inner wall of the back plate;

the fourth groove is located between the two lower bars, and a length direction of the fourth groove is consistent with the length direction of the two lower bars; and the third groove spans the two lower bars in the width direction of the resonance box, and forms a lower transverse sound tunnel on the inner wall of the back plate, while the fourth groove forms a lower longitudinal sound tunnel on the inner wall of the back plate.

3. The violin family according to claim 1, wherein:

a pillar is arranged at intersections of the first groove and the two upper bars; and a first end of the pillar is against a bottom of the first groove and a second end of the pillar is against the two upper bars.

4. The violin family according to claim 2, wherein:

the two upper bars are provided with an upper bridge opening, which is a breach on a first side of the two upper bars and makes the two upper bars form an upper bridge-style bar structure, and the upper bridge opening is erected on the first groove; and the two lower bars are provided with a lower bridge opening, which is a breach on a first side of the two lower bars and makes the two lower bars form a lower bridge-style bar structure, and the lower bridge opening is erected on the third groove.

5. The violin family according to claim 2, wherein an upper reinforcing plate is fixed between the two upper bars, and a lower reinforcing plate is fixed between the two lower bars.

6. The violin family according to claim 1, wherein:

a length of the first groove is less than a length of the front plate at a corresponding position of the first groove, and a smooth transition surface is arranged between two ends of the first groove and the inner wall of the front plate; and a length of the second groove is less than a length of the front plate at a corresponding position of the second groove, and a smooth transition surface is arranged between two ends of the second groove and the inner wall of the front plate.

7. The violin family according to claim 2, wherein:

a length of the third groove is less than a length of the back plate at a corresponding position of the third groove, and a smooth transition surface is arranged between two ends of the third groove and the inner wall of the back plate; and a length of the fourth groove is less than a length of the back plate at a corresponding position of the fourth groove, and a smooth transition surface is arranged between two ends of the fourth groove and the inner wall of the back plate.

8. The violin family according to claim 2, wherein the first groove, the second groove, the third groove and the fourth groove are all arc grooves.

9. The violin family according to claim 1, wherein a first upper bar of the two upper bars is located at a corresponding position of a bass foot of a bridge, and a second upper bar of the two upper bars is located at a corresponding position of a treble foot of the bridge.

10. The violin family according to claim 2, wherein, from a cross section of the resonance box, the two lower bars and the two upper bars are arranged correspondingly in upper and lower directions.

* * * * *